US011997728B1

United States Patent
Jagannath et al.

(10) Patent No.: US 11,997,728 B1
(45) Date of Patent: May 28, 2024

(54) MULTI-TASK LEARNING NEURAL NETWORK FRAMEWORK FOR RF SPECTRUM SENSING AND CLASSIFICATION

(71) Applicant: ANDRO Computational Solutions, LLC, Rome, NY (US)

(72) Inventors: Jithin Jagannath, Oriskany, NY (US); Anu Jagannath, Oriskany, NY (US); Nicholas Joseph Polosky, Albany, NY (US); Andrew Louis Drozd, Rome, NY (US)

(73) Assignee: ANDRO COMPUTATION SOLUTIONS, Rome, NY (US)

( * ) Notice: Subject to any disclaimer, the term of this patent is extended or adjusted under 35 U.S.C. 154(b) by 173 days.

(21) Appl. No.: 17/213,301

(22) Filed: Mar. 26, 2021

Related U.S. Application Data

(60) Provisional application No. 63/000,637, filed on Mar. 27, 2020.

(51) Int. Cl.
  *H04W 24/02* (2009.01)
  *G06F 18/214* (2023.01)
  *G06N 3/08* (2023.01)
  *H04W 76/11* (2018.01)
  *H04W 84/02* (2009.01)

(52) U.S. Cl.
  CPC .......... *H04W 76/11* (2018.02); *G06F 18/214* (2023.01); *G06N 3/08* (2013.01); *H04W 84/02* (2013.01)

(58) Field of Classification Search
  CPC .... H04W 76/11; H04W 84/02; G06K 9/6256; G06N 3/08
  See application file for complete search history.

(56) References Cited

U.S. PATENT DOCUMENTS

| | | | | |
|---|---|---|---|---|
| 5,812,078 | A | * | 9/1998 | Przybysz .............. H03M 3/404 341/143 |
| 11,093,714 | B1 | * | 8/2021 | Bhatia .................. G06N 3/0445 |
| 2006/0066481 | A1 | * | 3/2006 | Goldberg ................ H04B 7/10 370/335 |
| 2017/0344808 | A1 | * | 11/2017 | El-Khamy ........... G06V 40/168 |
| 2018/0089558 | A1 | * | 3/2018 | Wittenberg ............ G06N 3/044 |
| 2018/0324595 | A1 | * | 11/2018 | Shima .................. H04B 7/0413 |
| 2020/0036710 | A1 | * | 1/2020 | Khanna ................. H04W 12/06 |

* cited by examiner

*Primary Examiner* — Jamal Javaid
(74) *Attorney, Agent, or Firm* — Hoffman Warnick LLC

(57) ABSTRACT

A signal sensing and classification system, including: a detection module for obtaining a spectrum of signals; a separation module for extracting a signal from the spectrum of signals; and a multi-task learning (MTL) module for performing a plurality of tasks in parallel on the extracted signal using an MTL neural network model; the plurality of tasks including at least two of: determining a signal class of the extracted signal; determining a modulation class of the extracted signal; and determining at least one signal descriptor of the extracted signal. Additional tasks may include, for example, radio frequency (RF) fingerprinting on the extracted signal to identify an RF device that produced the extracted signal. Other classification and regression tasks may also be performed by the MTL neural network model.

19 Claims, 10 Drawing Sheets

MULTI-TASK LEARNING NEURAL NETWORK FRAMEWORK FOR RF SPECTRUM SENSING AND CLASSIFICATION

STATEMENT REGARDING FEDERAL RIGHT

This invention was made with government support under contract numbers W9113M2000067 and W56KGU19C0054 awarded by the United States Army. The government has certain rights in the invention.

BACKGROUND

The present disclosure relates to the analysis of signals, and more specifically, to a multi-task learning neural network framework for radio frequency (RF) spectrum sensing and classification.

Wireless signal recognition plays a vital role in the modern era of wireless communication where heterogeneous wireless entities belonging to civilian, commercial, government, and military applications share the electromagnetic spectrum. Recent years have witnessed an explosive growth of Internet of Things (IoT) devices in critical applications such as smart healthcare, smart industry, smart cities, smart homes, smart vehicles, among others. The diverse and large scale IoT deployment leads to critical security vulnerabilities in addition to spectrum scarcity.

Wireless signal recognition is an emerging technique for identifying and mitigating security weaknesses as well as enabling cooperative spectrum sharing to maximize spectrum utility. Signal recognition can be defined as the process of extracting signal descriptors (modulation, signal type, hardware intrinsic features, etc.) to characterize the RF waveform. Spectrum sharing to improve spectrum utilization serves as a key enabler for fifth-generation (5G) and beyond 5G (B5G) communications whereby various emitters in the vicinity are sensed and identified to allocate and utilize the spectrum in a cooperative manner. Realizing the need for improved spectrum sharing to sustain communications, the Federal Communications Commission (FCC) has allocated the Citizens Broadband Radio Service (CBRS) in the 3.5 GHz radio band. The CBRS band will be cooperatively shared between commercial and government agencies such that only 150 MHz is utilized at a time.

With advancements in signal processing, the waveforms generated by tactical radars and communication devices are designed to be stealthy to prevent detection/interception by electronic countermeasure systems. Such radars, commonly referred to as low probability of intercept (LPI) radars, are harder to recognize compared to conventional radar emissions. To keep pace with signal processing advancements, signal intelligence systems must be designed to strengthen the electronic countermeasure systems employed in military and tactical domains. Such electronic countermeasure systems are an inseparable part of military active protection systems (APS).

Conventional radar emitter identification techniques typically rely on a library of pulse descriptor words (PDW), which differentiate the radar emitters based on parameters including transmission radio frequency (RF), pulse repetition interval (PRI), pulse width (PW), pulse amplitude (PA), and so on. Such library-based methods may not be sufficient against modern LPI radar signals in dense complex RF scenarios that experience concurrent transmissions.

In the analysis of signals, humans regularly use an array of different signal descriptors (e.g., modulation, bandwidth, etc.); however, machine learning based signal analysis systems are often trained to perform a singular classification or a single regression task. Additionally, signal analysis systems may be trained to perform a single mission relevant task.

Traditionally, radar signal analysis systems have used a handful of predetermined features to represent an acquired signal. In using predetermined features, it is assumed that these features provide the best representation of the signal to perform the desired task. While expert domain knowledge may be useful in the learning frameworks, it may not prove the best representation of a signal for a prescribed task.

Moreover, operational scenarios in military and tactical scenarios may be congested with the existence of several ongoing radar emissions by friendly as well as adversarial (and neutral) systems. As such, electronic countermeasure systems must be enabled with advanced signal intelligence (SIGINT) systems to differentiate the various emissions to classify the sources of those emissions.

SUMMARY

An aspect of the disclosure is directed to a signal sensing and classification system, including: a detection module for obtaining a spectrum of signals; a separation module for extracting a signal from the spectrum of signals; and a multi-task learning (MTL) module for performing a plurality of tasks in parallel and simultaneously on the extracted signal using an MTL neural network model; the plurality of tasks including at least two of: determining a signal class of the extracted signal; determining a modulation class of the extracted signal; determining at least one signal descriptor of the extracted signal; performing a classification task; and performing a regression task.

Another aspect of the disclosure is directed to a signal sensing and classification method, including: obtaining a spectrum of signals; extracting a signal from the spectrum of signals; and performing a plurality of tasks in parallel and simultaneously on the extracted signal using a multi-task learning (MTL) neural network model; the plurality of tasks including at least two of: determining a signal class of the extracted signal; determining a modulation class of the extracted signal; determining at least one signal descriptor of the extracted signal; performing radio frequency (RF) fingerprinting on the extracted signal to identify an RF device that produced the extracted signal, performing a classification task; and performing a regression task.

A further aspect of the disclosure is directed to a signal sensing and classification method, including: obtaining a spectrum of radio frequency (RF) signals; extracting a signal from the spectrum of RF signals; and performing a plurality of tasks in parallel on the extracted signal using a multi-task learning (MTL) neural network model, wherein the MTL neural network model comprises a hard parameter sharing deep convolutional neural network model the plurality of tasks including at least two of: determining a signal class of the extracted signal; determining a modulation class of the extracted signal; determining at least one signal descriptor of the extracted signal; performing radio frequency (RF) fingerprinting on the extracted signal to identify an RF device that produced the extracted signal; performing a classification task; and performing a regression task.

Yet another aspect of the disclosure is directed to a multi-task learning (MTL) module for performing a plurality of tasks in parallel and simultaneously on a signal using an MTL neural network model; the plurality of tasks including at least two of: determining a signal class of the extracted signal; determining a modulation class of the extracted signal; determining at least one signal descriptor of the extracted signal; performing radio frequency (RF) fingerprinting on the extracted signal to identify an RF device that produced the extracted signal; performing a classification task; and performing a regression task.

BRIEF DESCRIPTION OF THE DRAWINGS

The embodiments of this disclosure will be described in detail, with reference to the following figures, wherein like designations denote like elements.

Figure 1:
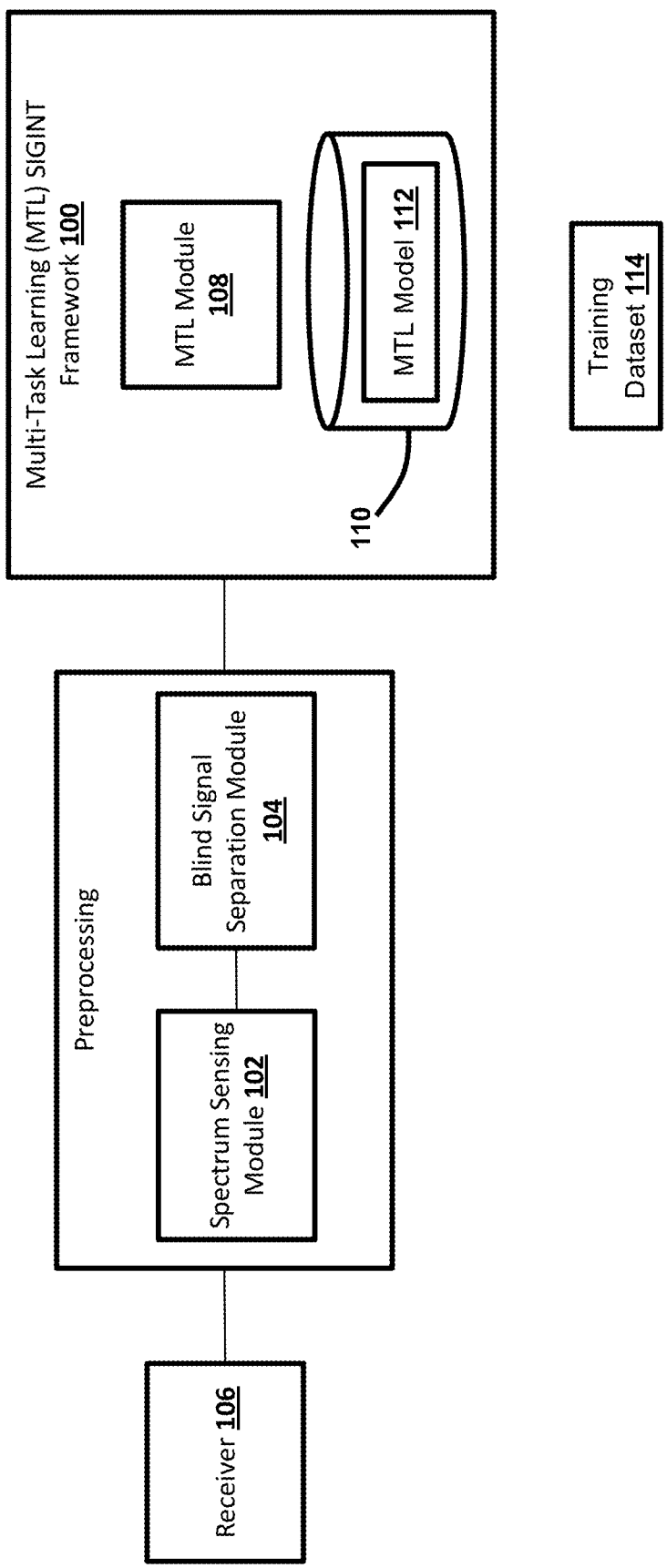
FIG. 1 depicts a multi-task learning (MTL) signal intelligence (SIGINT) framework for spectrum awareness and classification according to various embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. The following description is, therefore, merely illustrative.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments disclosed herein were chosen and described in order to best explain the principles of the disclosure and the practical application, and to enable others of ordinary skill in the art to understand the disclosure for various embodiments with various modifications as are suited to the particular use contemplated.

The present disclosure relates to the analysis of signals, and more specifically, to a multi-task learning (MTL) SIGINT framework for spectrum awareness and classification (hereafter MTL SIGINT framework). The MTL SIGINT framework is configured, for example, to perform radio frequency (RF) signal signature detection and classification that reduces cognitive burden on signal analysts. An RF environment often has several waveform types belonging to different families—radar, commercial cellular, WiFi, other sources, etc. Spectrum awareness is a critical requirement to thrive in a tactical setting as well as to enable spectrum sharing coexistence (for e.g., CBRS band in which incumbent Navy radar emissions must coexist with commercial cellular).

To ensure robust operation, the MTL SIGINT framework according to embodiments may be trained with a comprehensive dataset generated using a combination of simulation and real over-the-air (OTA) signals transmitted, for example, using a software defined radio testbed. The radios in the radio testbed can emulate and mimic congested RF scenarios to represent typical tactical operating environments.

A typical active protection system (APS) system is an aggregation of several electronic-countermeasure subsystems under one roof. Such systems are prone to interfere with each other and may degrade each other's performance. The MTL SIGINT framework according to embodiments may be used to generate a radio environment map (REM) to ensure existing and any new sensor/subsystems will peacefully coexist. The MTL SIGINT framework may also be used to measure the RF visibility footprint left behind by a system that an enemy combatant may detect and/or exploit. In general, the MTL SIGINT framework may be used in any system that includes an RF frontend with processing capabilities, including, without limitation, handheld radios, manpack radios, unmanned aerial vehicles (UAVs), and/or the like.

The MTL SIGINT framework is a neural network-based signal intelligence system designed, for example, to enable electronic warfare (EW) capabilities in tactical vehicles. The MTL SIGINT framework is designed to inherently generalize better (without overfitting) and is capable of future expansion without further human development being necessary.

The configuration of the MTL SIGINT framework provides an open and modular architecture that may be easily transitioned to modular active protection systems (MAPS) (e.g., for tactical vehicles) and may be beneficial for tactical systems that often operate under congested, remote, and hostile spectrum conditions. The MTL SIGINT framework is capable of separating signal mixtures to uniquely classify their modulation and identify their emitter. The MTL approach of the MTL SIGINT framework provides the ability to use higher modularity features, inductive transfer between tasks, perform implicit regularization without imposing a uniform penalty on all complex models, and to add new training signals in the future without requiring additional human development.

Today's tactical systems often operate in a remote, hostile, and congested spectrum with several ongoing active transmissions from adversarial, neutral, and friendly forces. Most combat vehicles such as Stryker, Bradley, Abrams, ASV150, Flyer-60, HMMWV, etc., are equipped with modern early warning systems to track, intercept, and perform soft/hard kill electronic countermeasures to protect equipment and the lives of soldiers. To achieve this, APS-based solutions are often installed on tactical vehicles, typically as an integrated system housing several subsystems. Several such APS systems include Trophy, Iron Fist, TRAPS, Iron Curtain, Bright Arrow, etc. SIGINT is an imperative part of the APS, which allows operators to identify and analyze the operational environment. This necessitates the need for a SIGINT system that can operate in a dense spectrum condition, identify the emissions, and present actionable intelligence to the operator or the interfaced subsystem. The MTL SIGINT framework according to embodiments provides this capability by leveraging multi-task learning and blind signal separation to provide a robust, modular, and expandable capability designed for congested RF environments, providing more effective signal classification with less human intervention.

The MTL SIGINT framework according to embodiments may be used in any type of system that includes an RF frontend and processing capabilities. For example, the MTL SIGNIT framework may be installed in MAPS base kits that are mounted, for example, on small unmanned/manned airborne, naval and ground-based platforms, with an open framework to adapt to evolving customer needs and future waveforms. The MTL SIGINT framework will be a direct fit for the Army's recent effort to develop MAPS where the MTL SIGINT framework may serve as a subcomponent to any MAPS systems allowing effortless integration and coexistence with other submodules. Further, a REM generated by the MTL SIGINT framework can improve the spectrum awareness of APS systems. The REM will show the identified signals sharing the allocated frequency bands which can be further extended to enable dynamic spectrum access (DSA) that is becoming necessary in congested operating environments. Such a capability significantly enhances the spectrum awareness of APS.

Wireless signal recognition is becoming increasingly more significant for spectrum monitoring, spectrum management, and secure communications. Consequently, it will become a key enabler with the emerging fifth-generation (5G) and beyond 5G communications, Internet of Things (IoT) networks, among others. State-of-the-art studies in wireless signal recognition have only focused on a single task, which in many cases provides insufficient information for a system to act on. In this disclosure, for the first time in the wireless communication domain, the potential of deep neural networks in conjunction with a multi-task learning (MTL) framework is exploited to simultaneously learn waveform classification and regression tasks including, for example, modulation classification, signal classification, RF fingerprinting, bandwidth estimation, etc. The MTL model benefits from the mutual relationship between the related tasks in improving classification accuracy as well as learning efficiency with a lightweight neural network model. Further, the disclosure considers the problem of heterogeneous wireless signals such as radar and communication signals in the electromagnetic spectrum. Accordingly, the MTL model disclosed herein outperforms several state-of-the-art single-task learning classifiers while maintaining a lighter architecture and performing a plurality of signal characterization tasks simultaneously.

Signal recognition is a widely studied topic, however, it has been segmented into subtasks such as modulation recognition, signal type (wireless technology) classification, etc., and studied independently. Furthermore, most of the recent work in this realm focuses either on common communication waveforms or radar signals. In a tactical setting as well as in the current scenario of spectrum sharing between government and commercial entities, radar as well as communication waveforms are required to coexist. Therefore, both categories of waveforms should be considered in the signal recognition problem. Additionally, it is advantageous to design a framework that can perform multiple tasks simultaneously to provide more comprehensive information regarding the signal. Consequently, according to embodiments, the wireless signal recognition problem is jointly modeled in a novel parallel multi-task setting for radar as well as communication waveforms.

According to embodiments of the disclosure, a deep neural network in conjunction with MTL is used to simultaneously learn classification and regression tasks including, for example, modulation classification, signal classification, RF fingerprinting, bandwidth estimation, etc. Unlike prior attempts in wireless signal recognition, these aforementioned tasks are jointly modeled as parallel subtasks in an MTL setting. Further, the MTL framework generalizes better with a greater number of tasks since the model learns shared representation that captures all tasks. Hence, in the future, additional signal classification or regression tasks can be included in the architecture.

An MTL SIGINT framework 100 according to embodiments of the disclosure is depicted in FIG. 1. As shown, signal mixtures intercepted by a receiver 106 (e.g., under dense RF scenarios with several ongoing RF transmissions) are preprocessed by a spectrum sensing (e.g., signal detection) module 102 (e.g., an energy detector, cyclostationary detector, etc.) and a blind signal separation module 104. Signals output by the blind signal separation module 104 are provided to the MTL SIGINT framework 100. The MTL SIGINT framework 100 includes a multi-task learning module 108 (hereafter MTL module 108) and a memory 110 for storing a trained MTL model 112 (with training weights) for use (e.g., processing) by the MTL module 108. As will be described in greater detail below, a training dataset 114 may be provided to train the MTL model 112.

Dataset Generation

The MTL model 112 may be trained on a vast and rich training dataset 114 of signals (e.g., including both low probability of intercept (LPI) as well as traditional non-LPI radar signals) generated, for example, using a software defined radio (SDR)-based testbed in addition to a numerical computing environment such as GNU Radio, MATLAB. Each signal (e.g., corresponding to a signal family) in the training dataset 114 may be generated for varying modulation parameters, noise settings, carrier and sampling frequencies, and/or the like. By generating the signals on actual radios in addition to using simulations, the added advantage of representing actual OTA transmissions as observed in realistic scenarios is provided. The training dataset 114 may also include signal mixtures generated in simulations as well as on radio platforms (e.g. with a single radio generating the signal mixture or multiple radios transmitting signals that will interfere at the receiver) to represent a congested RF spectrum that is representative of a dense RF scenario typically faced by tactical military systems.

Tactical systems contend with modern electrical warfare and advanced electronic attack systems on the battlefield. To survive such advanced systems, radar systems have been designed to be stealthy to prevent detection by intercept receivers. Such radars, referred to as LPI radars, mask their presence by spreading signal power over a wider bandwidth, adopting frequency agility, and intrapulse modulation techniques. To this extent, the training dataset 114 may include realistic conventional (non-LPI) and LPI radar waveforms typical of such tactical scenarios.

The training dataset 114 may include a wide variety of waveforms. The variables in a radar waveform may include, for example, radio frequency (RF), pulse width (PW), pulse repetition interval (PRI), modulation, and polarization, among others.

Non-LPI Radar Waveforms

Continuous wave (CW) radars: CW radars emit monofrequency/dual-tone CW and possess excellent Doppler sensitivities but limited range resolution. The monotone CW waveform can be expressed by the equation $$s(t) = \cos 2\pi f_c t,$$

where t denotes time scale, and $f_c$ is the monotone frequency. Similarly, the duotone CW can be represented by $$s(t) = \cos 2\pi f_{c1} t + \cos 2\pi f_{c2} t,$$

where the dual tomes are $f_{c1}$ and $f_{c2}$, respectively.

Pulsed Radars: Pulsed radar transmits high power RF pulses to provide both long range detection and Doppler resolution. Several pulsed radar waveforms are discussed below.

Monotone Pulse: Transmits a monotone signal during the pulse period as expressed by $$s(t) = rect\left\{\frac{t}{\tau}\right\} \cos 2\pi f_c t, \ 0 \le t \le \tau$$

where rect{.} implies the pulse waveform that transmits a monotone signal of frequency $f_c$ during its active period $\tau$.

Multitone Pulse: As the name suggests, a multitone pulse radar transmits a multitone signal during the pulse period ($\tau$), $$s(t) = rect\left\{\frac{t}{\tau}\right\}[\cos 2\pi f_{c1} t + \cos 2\pi f_{c2} t + \cdots + \cos 2\pi f_{cN} t], \ 0 \le t \le \tau$$

which contains N multiple tones $f_{c1}, f_{c2}, \ldots, f_{cN}$.

Stepped Frequency Pulse: Pulse waveform that transmits a chirp signal s(t) whose frequency ($f_c(t)$) steps between discrete values $$s(t) = rect\left\{\frac{t}{\tau}\right\} \cos 2\pi f_c t, \ 0 \le t \le \tau$$

$$f_c(t) = \begin{cases} f_0 & 0 \le t < \delta t \\ f_0 + \delta f & \delta t \le t < 2\delta t \\ f_0 + 2\delta f & 2\delta t \le t < 3\delta t, \ \delta t = \frac{\tau}{N} \\ \cdots & \cdots \\ f_{end} - \delta f & \tau - \delta t \le t < \tau \end{cases}$$

where $\tau$ is the duration of the stepped frequency waveform, N is the number of frequency steps, $\delta t$ is the time spacing between each step, and $\delta f$ is the frequency step.

LFM chirped pulse: A pulsed waveform that transmits a linear frequency modulated (LFM) chirp during the pulse duration is represented by $$s(t) = rect\left\{\frac{t}{\tau}\right\} \cos 2\pi (f_0 + (k/2)t)t, \ 0 \le t < \tau$$

where $k = (f_{end} - f_0)/\tau$ is the linear chirp rate.

LPI Radar Waveforms

LPI techniques simply refer to the approaches adopted to reduce a radar's effective radiated power (ERP) to prevent detection by electronic countermeasure systems. Pulse compression techniques are the most commonly adopted methodology to accomplish this. The ERP is reduced by spreading the signal energy over a wider bandwidth. Some typical LPI approaches include, for example, frequency shift keying (FSK), phase shift keying (PSK), hybrid FSK/PSK, and frequency modulation.

Frequency Shift Keying techniques: The transmit frequency $f_c$ of an FSK radar is chosen from a frequency hopping (FH) sequence of available frequencies for respective time intervals $$s(t) = \cos 2\pi f_c t, f_c = \{f_1, f_2, \ldots, f_N\} \text{ at } t = \{t_1, t_2, \ldots, t_N\}$$

with each frequency lasting $\tau_f$ duration.

Costas Code FSK: The FH sequence is derived from a Costas array and the Costas array of frequencies are used to hop frequencies.

Hybrid Costas-PSK: The hybrid technique combines the Costas FSK approach with that of BPSK modulation that uses Barker codes of varying length. As per the hybrid approach, each time duration $\tau_f$ is subdivided into $N_p$ phase sub-slots each of duration $\tau_p$ such that $\tau_f = N_p \tau_p$. Each time slot t of $\tau_f$ duration as previously mentioned will follow Costas FH sequence.

Phase Shift Keying techniques: PSK radars, also referred to as Phase-coded radars, use a pulse compression approach by which phase-coding divides a pulse into N sub-pulses that are assigned a phase-value based on a phase-code sequence. The signal waveform will take the form $$s(t) = \cos(2\pi f_c t + \phi_c),$$

where $\phi_c$ refers to the phase codes as per the chosen method.

Polyphase Codes: In polyphase coding, the waveforms are phase modulated by the phases of the specified code. Such polyphase codes involve Frank, $P_1$, $P_2$, $P_3$, $P_4$, and bi-phase Barker codes.

Polytime Codes: Polytime coding is another approach to approximating a stepped frequency or LFM waveform. In polytime coding, the time spent at each phase state changes throughout the duration of the code period. Polytime code sequences use fixed phase states with varying time periods at each phase state. The different polytime codes are T1(n), T2(n), T3(n), and T4(n) with n phase states.

Frequency Modulation Continuous Wave (FMCW): Linear triangular FMCW is a primary CW LPI waveform with excellent resistance to jamming. The frequency modulation spreads its energy over a wider modulation bandwidth presenting a rectangular power spectrum over the modulation bandwidth. The frequency modulation takes a triangular form with positive and negative slopes such that $$f_{positive} = f_c - \frac{\Delta F}{2} + \frac{\Delta F}{t_m} t \text{ such that } 0 \le t < t_m,$$

and $$f_{negative} = f_c + \frac{\Delta F}{2} - \frac{\Delta F}{t_m} t \text{ such that } t_m \le t < 2t_m,$$

where $f_c$ is the RF carrier frequency, $t_m$ is the modulation period, and $\Delta f$ is the modulation bandwidth. The FMCW technique is currently employed, for example, in Navico BR24, Thales SMART-L, Thales SCOUT, Kvant PRY-MARA, Indra ARIES, Indra RAVEN, STRUNA-1 bistatic radar, Thales SQUIRE, Saab Pilot Mk3, etc.

All of the above signal models may be generated, for example, using a combination of MATLAB and a software defined radio (SDR) testbed to transmit OTA with SDRs under varying noise, modulation parameters, RF congestion, and considering various mobility settings. The congestion settings imply the number of active signal transmissions during a signal capture/interception period. The RF congestion can be emulated with the radios or generated experimentally with multiple radios to mimic a challenging tactical RF environment. Such real-time signal captures and simulated signals may be used to form a comprehensive RF training dataset 114 to train the MTL model 112.

According to some embodiments, the training dataset 114 may be generated for radar and communication signals using GNU Radio Companion for varying signal-to-noise ratios (SNRs). GNU Radio is a free and open-source software development toolkit that provides signal processing blocks to implement software radios. It can be used with readily-available low-cost external RF hardware to create software-defined radios, or without hardware in a simulation-like environment. GNU Radio Companion (GRC) is a graphical user interface that may be used to build GNU Radio flow graphs.

Wireless RF signals can take multiple modulation formats. For example: an IEEE802.11a OFDM waveform can possess binary phase-shift keying (BPSK), quadrature phase-shift keying (QPSK), and quadrature amplitude modulation (QAM) modulations. Similarly, satellite communication signals may have Mary phase-shift keying (PSK) modulations. Several radar signals, for example, airborne-detection, airborne-range, air-ground-MTI, and ground mapping adopt pulsed continuous wave (PCW) modulation but differ in the transmission parameters such as pulse repetition rate, pulse width, and carrier frequency. Further, AM radio signals may carry either amplitude modulated double side-band (AM-DSB) or amplitude modulated single side-band (AM-SSB) waveforms. To this extent, according to embodiments, the MTL module 108 of the MTL SIGINT framework 100 may be used to identify not only the modulation format but also the signal type to accurately recognize the waveform.

Example Training Datasets

Two datasets with modeled propagation effects were generated, RadComAWGN and RadComDynamic, at a sample rate of 10 MS/s. RadComAWGN included a total of nine modulation classes and eleven signal classes. The modulation classes included pulsed continuous wave (PCW), frequency modulated continuous wave (FMCW), binary phase-shift keying (BPSK), amplitude modulated double side-band (AM-DSB), amplitude modulated single side-band (AM-SSB), amplitude shift keying (ASK), Gaussian frequency-shift keying (GFSK), direct sequence spread spectrum complementary code keying (DSSS-CCK), and direct sequence spread spectrum offset quadrature phase-shift keying (DSSS-OQPSK). The signal classes included radar waveforms (airborne-detection, airborne-range, air-Ground-MTI, ground mapping, radar-altimeter) and communication waveforms (Satcom, AM Radio, short-range, Bluetooth, WiFi (IEEE802.11bg), and Zigbee (IEEE802.15.4)). The Bluetooth, WiFi (IEEE802.11bg), and Zigbee (IEEE802.15.4) signal classes were extracted from an interference dataset. All of the waveforms with the exception of Bluetooth, WiFi (IEEE802.11bg), and Zigbee (IEEE802.15.4) were generated in GNU Radio with additive white Gaussian noise (AWGN) under varying SNR levels (−20 dB to 18 dB in steps of 2 dB).

The RadComDynamic dataset contains all of the waveforms in RadComAWGN except for Bluetooth, IEEE802.11bg, and IEEE802.15.4. The waveforms in the RadComDynamic dataset are subject to propagation effects and hardware uncertainties such as multipath, fading, scattering, doppler effects, oscillator drift, and sampling clock offset as shown in Table I:

TABLE I

| RadComDynamic: Dynamic settings | |
|---|---|
| Dynamic Parameters | Values |
| Carrier frequency offset std. dev/sample | 0.05 Hz |
| Maximum carrier frequency offset | 250 Hz |
| Sample rate offset std. dev/sample | 0.05 Hz |
| Maximum sample rate offset | 60 Hz |
| Num. of sinusoids in freq. selective fading | 5 |
| Maximum doppler frequency | 2 Hz |
| Rician K-Factor | 3 |
| Fractional sample delays comprising power delay profile (PDP) | [0.2, 0.3, 0.1] |
| Number of multipath taps | 5 |
| List of magnitudes corresponding to each delay in PDP | [1, 0.5, 0.5] |

The propagation channel was chosen to be Rician with K-factor 3. The dataset was partitioned into 70% training, 20% validation, and 10% testing sets. Hyper-parameter evaluations were performed with the RadComAWGN dataset.

Blind Signal Separation

Blind signal separation performed by the blind signal separation module 104 allows the MTL SIGINT framework 100 to distinguish between signals in a congested RF spectrum scenario. This may be an important requirement in real deployment scenarios where the RF spectrum may contain multiple simultaneous emitters.

Tactical military systems often operate under a remote congested RF scenario where multiple friend/foe systems operate simultaneously. A key challenge which is often underrated by several electronic countermeasure systems is to separate the signals generated by these miscellaneous systems to identify them lucidly. To ensure accurate signal identification in a dense spectrum condition, the blind signal separation module 104 of the MTL SIGINT framework 100 is configured to clean up the received spectrum to identify the underlying signals embedded therein.

In a typical tactical operating scenario, several active transmissions prevail causing the signal interceptors to receive a signal amalgam. This is a common effect of a dense RF spectrum. According to various embodiments of the disclosure, the blind signal separation module 104 of the MTL SIGINT framework 100 may utilize a generalized Eigenvalue decomposition-based signal separation technique, described below, to separate the received linear mixture of signals.

The signal separation challenge can be considered as a problem of recovering original signals from their linear mixtures without apriori knowledge of the mixing matrix. The mixing matrix represents the surrounding noise and other environmental disturbances through which the signals interfere with each other. Consider an N-dimensional signal matrix, S, whose rows correspond to the different signals that are interfering, and columns represent the instantaneous samples of the signals. Let the mixing matrix be denoted by M. Now the mixed-up signals that are received at a P-antenna receive array can be expressed as R=MS.

To recover the original signals from the observation/received signal mixture, an inverting matric F is obtained such that $F^H M = I$. Applying such an inverting matrix yields the original signal matrix S:

$$F^H R = F^H MS = S.$$

Examining the covariance matrix of the observation matrix, $$C_R = RR^H = MSS^H M^H = MC_S M^H$$

where $C_S$ is diagonal assuming independent, decorrelated sources. To represent the problem as a generalized eigenvalue problem, assume there exists another autocorrelation matrix $A_S$ that has the same diagonalization property such that $$A_R = MA_S M^H.$$

Multiplying both sides of $C_R$ with F:

$$\begin{aligned} C_R F &= MC_S M^H FA_S A_S^{-1} \\ &= MA_S M^H FC_S A_S^{-1} \\ &= A_R FC_S A_S^{-1} \\ &= A_R F\Lambda \end{aligned}$$

This is now a generalized eigenvalue problem $$\Rightarrow C_R F = A_R F\Lambda,$$

where the task is to find the Eigen value matrix and Eigenvector matrix.

The unknown mixing matrix F can now be estimated as the eigenvector matrix. For non-stationary and decorrelated signals, $A_R = C_R$. Having estimated the mixing matrix F, the signal separation can now be performed by FHR which will yield the component signals.

The blind signal separation module 104 of the MTL SIGINT framework 100 may be tested with the training dataset 114 under varying congestion settings. To evaluate the performance of the blind signal separation technique used by the blind signal module 104 of the MTL SIGINT framework 100, the correlation coefficient between the original and separated signal components under varying noise settings may be used as a key performance parameter (KPP) metric.

Multi-Task Learning Framework

MTL is a neural network paradigm for inductive knowledge transfer, which improves generalization by learning shared representation between related tasks. MTL improves learning efficiency and prediction accuracy on each task in contrast to training a single-task learning (STL) model for each task.

MTL can be motivated through the idea of imposing an inductive bias on the hypotheses that the model considers when attempting to learn a given task. This generally leads the model to prefer hypotheses that can explain multiple tasks resulting in a better overall generalization ability of the model. Additionally, learning multiple tasks implicitly introduces more noise into learning process, which requires the model to learn a more general representation than it would if it were to learn a single task alone. MTL can also improve performance in singular tasks when the task-specific data is very noisy or highly dimensional. When this is the case, it may be hard for a single task model to identify the important features; however, a MTL model may be able to do so if those features are also relevant in the other tasks the model is learning to perform. Lastly, MTL can be seen as a form of regularization, which helps models generalize better to unseen data.

The MTL model 112 only requires one homogenous training set of data, whereas an ensemble of STL models may learn to perform their tasks using different representations of the input signal making it costlier to obtain and add new knowledge to the model. MTL solutions inherently have a superior aptitude to generalize better than ensembles of single-task learning solutions because learning to perform multiple tasks from a single representation forces a more general shared representation. Additionally, the introduction of noise from multiple training processes implicitly requires a "more general" solution.

Retraining of the MTL model 112 requires no further human algorithm development. In contrast with a hand-crafted estimator approach which may require hand-tuned parameters to be set and potentially changed upon the addition of new data to the training dataset, the MTL model 112 only needs to retrain the model in the same way it was initially done, with the addition of the newly acquired data to the training dataset.

The trained MTL model 112 of the MTL SIGINT framework 100 is capable of identifying classes of signals and/or emitters, and is configured to output an array of signal descriptors (e.g., bandwidth, PWD parameters, etc.). The MTL module 108 of the MTL SIGINT framework 100 can generalize without overfitting to the training dataset 114 to enable better performance when deployed in a hostile environment. Further, the MTL module 108 of the MTL SIGINT framework 100 is capable of future expansion to include new signals without requiring any additional human algorithm development.

Several types of MTL models 112 may be employed by the MTL module 108 of the MTL SIGINT framework 100, including for example, a hard parameter sharing model, a sluice network model, and a kernel-based model. Each of these MTL models 112 may be neural network based, for example, using deep convolutional neural networks (DCNNs) as their architectures. DCNNs are versatile enough to seamlessly handle different signal representations, such as time domain, frequency domain, or time-frequency representations.

When the MTL module 108 of the MTL SIGINT framework 100 utilizes a hard parameter shared MTL model 112, the hidden layers among all tasks are shared while preserving certain task-specific layers. Hard parameter sharing significantly reduces the risk of overfitting by the order of the number of tasks. As the hard parameter shared MTL model 112 learns more tasks, it extracts shared representation that captures all of the tasks thereby improving the generalization capability of the model. Including additional tasks to the hard parameter shared MTL model 112 will, therefore, improve the learning efficiency of the model. For instance, modulation classification and signal classification are related tasks that can benefit from each other with the hard parameter shared MTL model 112. Further, such an architecture has the added advantage to benefit from additional tasks motivating the possibility to include future signal characterization tasks.

Given an input signal, the hard parameter shared MTL model 112 used by the MTL module 108 of the MTL SIGINT framework 100 may classify a signal as belonging to a specific modulation and signal class. The modulation and signal classification tasks may be optimized with categorical cross-entropy losses denoted by $L_m$ and $L_s$, respectively. The overall multi-task loss ($L_{mtl}$) function is represented as a weighted sum of losses over the modulation and signal classification tasks:

$$L_{mtl}(\theta_{sh}, \theta_m, \theta_s) = w_m L m(\theta_{sh}, \theta_m) + w_s L s(\theta_{sh}, \theta_s)$$

Here, the joint multi-task loss is parameterized by the shared ($\theta_{sh}$) as well as task-specific ($\theta_m$, $\theta_s$) parameters. The weights over the task-specific losses are denoted by $w_m$ and $w_s$. The MTL training is denoted as the optimization:

$$\theta^* = \arg\min_{\theta_{sh}, \theta_m, \theta_s} L_{mtl}(\theta_{sh}, \theta_m, \theta_s)$$

The MTL optimization aims to tune the network parameters such as to minimize the overall task loss.

Figure 2:
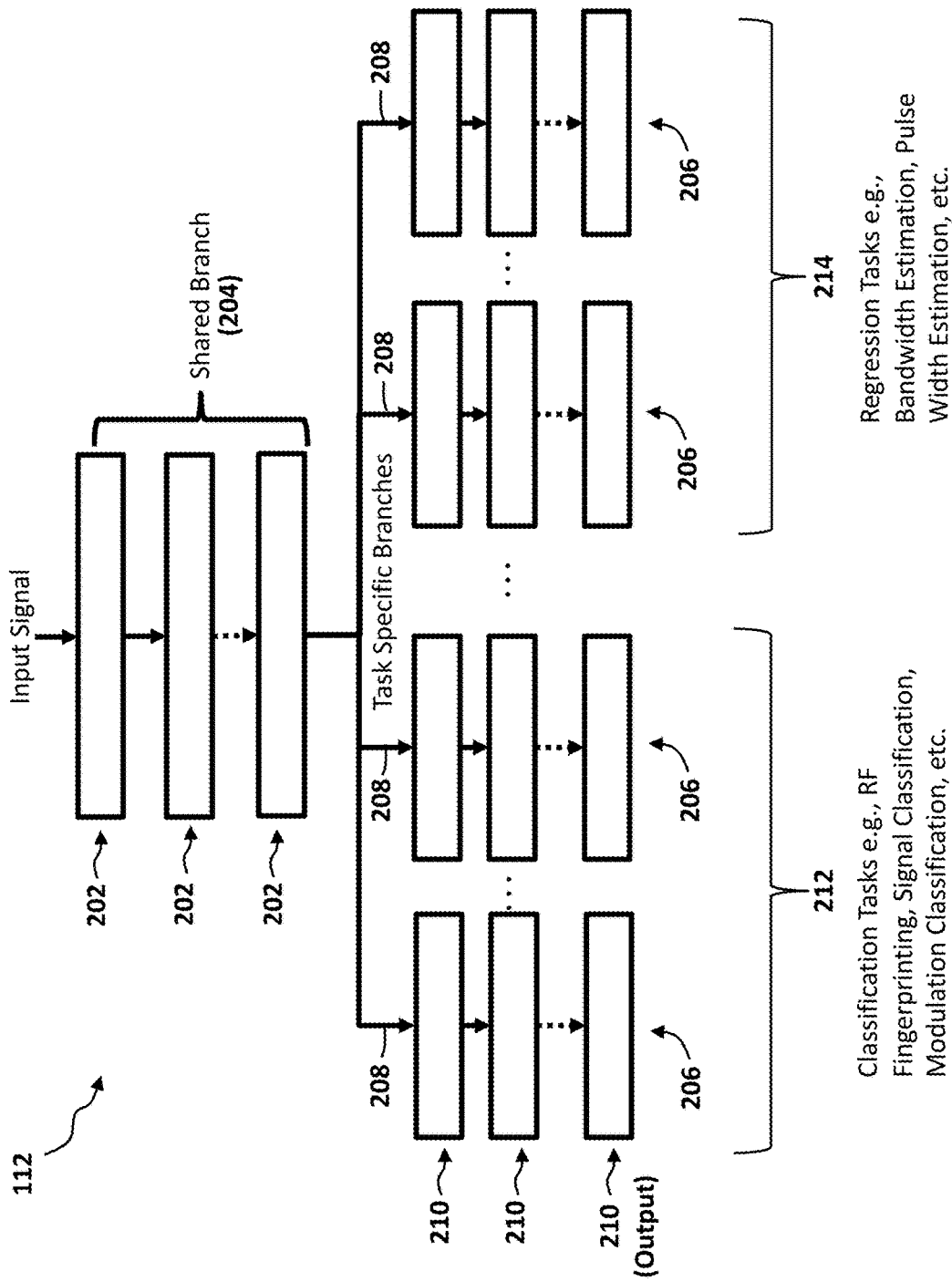
FIG. 2 depicts a neural network-based MTL model of the MTL SIGINT framework of FIG. 1 according to various embodiments of the disclosure.

An illustrative MTL model 112 employing a hard parameter sharing DCNN MTL solution according to embodiments is depicted in FIG. 2. Hard parameter sharing in MTL refers to the fact that each task is performed using the exact same parameters, as opposed to soft parameter sharing where parameters across tasks may be distributed according to the same distribution but may not be exactly equal. In the MTL model 112 depicted in FIG. 2, the parameters of the initial layers 202 in the shared branch 204 are shared across a plurality of tasks 206, performed in parallel and simultaneously, and subsequently split into a plurality of task-specific information branches 208 which preserve their own task-specific parameters. Each of the task-specific information branches 208 may include a plurality of task-specific layers 210 (including an output layer 210) and may be trained using its own task-specific loss function. According to embodiments, as shown in FIG. 2, the MTL model 112 may include a set 212 of tasks 206 directed to classification tasks (e.g., RF fingerprinting (e.g., detecting an individual device using unique characteristics of its signal transmission (even if the same signal is transmitted by another device)), signal classification, modulation classification, etc.). The MTL model 112 may further include a set 214 of tasks 206 directed to regression tasks (e.g., bandwidth estimation, pulse width estimation, etc.). The MTL model 112 may, of course, include other task-specific information branches 208 corresponding to other tasks 206. The information provided at the output layer 210 of the MTL model 112 may be used, for example, to generate a radio environment map (REM), to measure an RF visibility footprint, and/or the like.

Exemplary versions of the loss functions for signal classification, modulation classification, and bandwidth regression are provided, but it should be noted that the hard parameter shared MTL model 112 of the MTL SIGINT framework 100 need not be limited to these three tasks 206. The loss functions described below for bandwidth estimation, modulation classification, and signal classification are the mean squared error, multi-class classification, and binary classification loss functions respectively. Here, $\zeta$, denotes the commonly used softplus function. Additional tasks performed by the hard parameter shared MTL model 112 may be added through the addition of task-specific information branches 208 (i.e. layers 210) and the associated task-specific loss functions $$\mathcal{L}_{bwidth} = \frac{1}{m}\sum_{i=1}^{m}(\hat{y}_i - y_i)^2,$$

-continued $$\mathcal{L}_{mod} = -\sum_{i=1}^{m}\log(\text{softmax}(\hat{y}_i)),$$

$$\mathcal{L}_{sig.class} = \sum_{i=1}^{m}\varsigma((1 - 2\hat{y}_i)\hat{y}_i)$$

It can be seen both in FIG. 2 and in the mathematical derivation of the exemplary loss functions that the hard parameter shared MTL model 112 can identify classes of signals and/or emitters as well as desired signal descriptors. According to embodiments, the representational complexity of the hard parameter shared MTL model 112 is maximized at the layer 202 immediately before the first task-specific layers 210. In other words, the aggregate information present at the output of each of the task-specific branches 208 is present in the representation of the input signal in the final shared layer 202. Intuitively, one can imagine the initial shared layers 202 learning a rich enough representation of the input signal to contain all the information necessary to perform each of the individual tasks 206. It is then the responsibility of task-specific layers 210 to learn how much and what parts of the information contained in the rich, shared representation is required to perform optimally in the given specific task 206.

Traditional handcrafted estimators may estimate parameters such as modulation, PWD, and other amplitude and phase related features and then feed them into the overall signal classifier. In contrast, according to embodiments, the hard parameter shared MTL model 112 disclosed herein has no such need to do this as that information is already contained in the rich, shared representation in the final shared layer 202. Furthermore, this fact motivates the desirability of an MTL solution with respect to the adaptation of the model.

Figure 3:
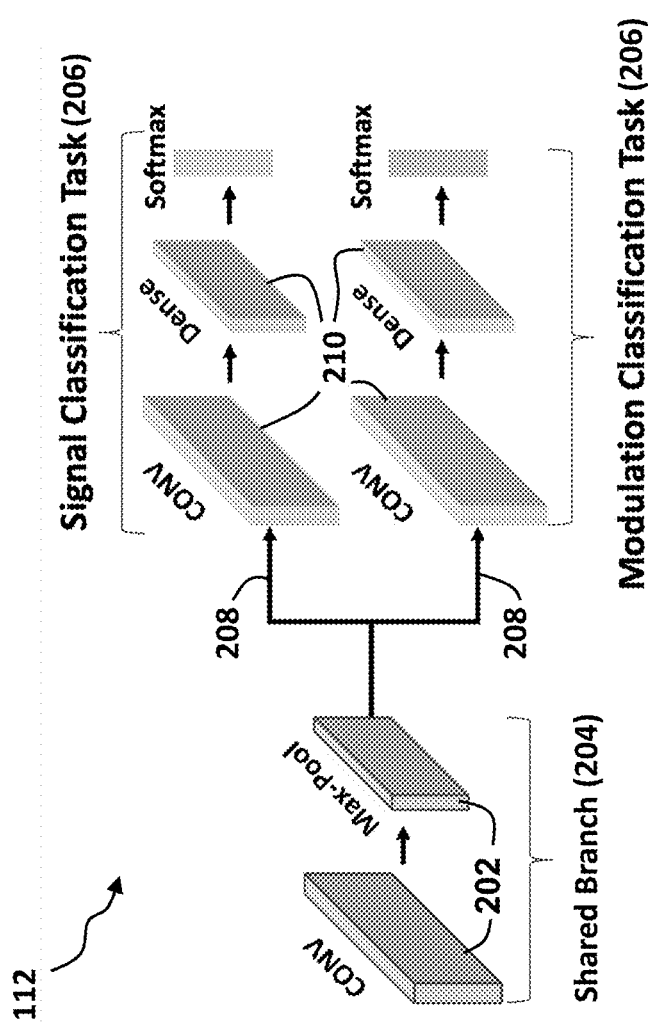
FIG. 3 depicts a detailed view of a portion of the MTL model of FIG. 2 according to various embodiments of the disclosure.

A more detailed view of a portion of the MTL model 112 of FIG. 2 according to embodiments is depicted in FIG. 3. As shown, the shared branch 204 may include hidden layers 202, for example, convolutional and max-pooling layers. Further, each task-specific branch 208 may include convolutional, fully-connected (dense), and output Softmax classification layers 210. The convolutional and fully-connected layers in the network may adopt a rectified linear (ReLU) activation function while the final output layer 210 in each task-specific branch could be sigmoid activation function.

The hyperparameters such as number of neurons per layer, number of layers, task loss weights, etc., of the MTL model 112 (e.g., to perform signal and modulation classification tasks) and their effects on training performance and classification accuracies were studied in-depth as elaborated in the upcoming sections. The MTL model 112 was trained with an Adam gradient descent solver for 30 epochs with a patience of 5. The learning rate was set to 0.001. A batch normalization was adopted prior to ReLU activation. The dropout rate of the shared layers was set to 0.25 and that of the task-specific branches was set to 0.25 and 0.5 in the convolutional and fully-connected layers, respectively. Unless otherwise stated the kernel size in the convolutional layers is 3×3 and the max-pooling size is 2×2. The signal and modulation classification task branches performed Softmax classification on 11 signal classes and 9 modulation classes for noise impaired waveforms (e.g., RadComAWGN, described above). The models were implemented in Keras with Tensorflow backend on an Ubuntu 18.04 VM running on an Intel Core i5-3230M CPU indicating the ease of model training on computationally simpler platforms (unlike GPUs).

Wireless Signal Representation

Let us denote the generated signal vector as $x^{id}$ where the superscript id represents the signal key used to extract the signal from the dataset. The generated signals are complex (IQ) samples of length 128 samples each. The signals were normalized to unit energy prior to storing them in the dataset to remove any residual artifacts from the simulated propagation effects. Data normalization allows a neural network to learn the optimal parameters quickly thereby improving convergence properties. The normalized data containing both I and Q samples can be denoted as $$\hat{x}^{id} = \hat{x}_I^{id} + j\hat{x}_Q^{id}.$$

Since neural IQ networks can only deal with real numbers, the complex number are vectorized as $$f\{\hat{x}^{id}\} = \begin{bmatrix} \hat{x}_I^{id} \\ \hat{x}_Q^{id} \end{bmatrix} \in \mathbb{R}^{256 \times 1}.$$

Mathematically, this can be shown with the relation $f: \mathbb{C}^{128 \times 1} \to \mathbb{R}^{256 \times 1}$.

The 256-sample input signal was reshaped to a 2D tensor of size 16×16 prior to feeding into the network. The waveforms were stored as key-value pairs in a HDF5 database such that the value can be extracted using the key. The waveform key was denoted by id={modulation format, signal class, SNR, sample number}, which matches it to the corresponding waveform in the dataset.

Effect of Task Weights

In this subsection, the effect of task-specific loss weights on the classification accuracy of the signal and modulation classification tasks will be described. For example, the classifier accuracy on the signal and modulation classification tasks when the signal strength is very low (SNR=−2 dB) was analyzed. Detection of even the weakest power signal corresponds to improved detection sensitivity.

Figure 4:
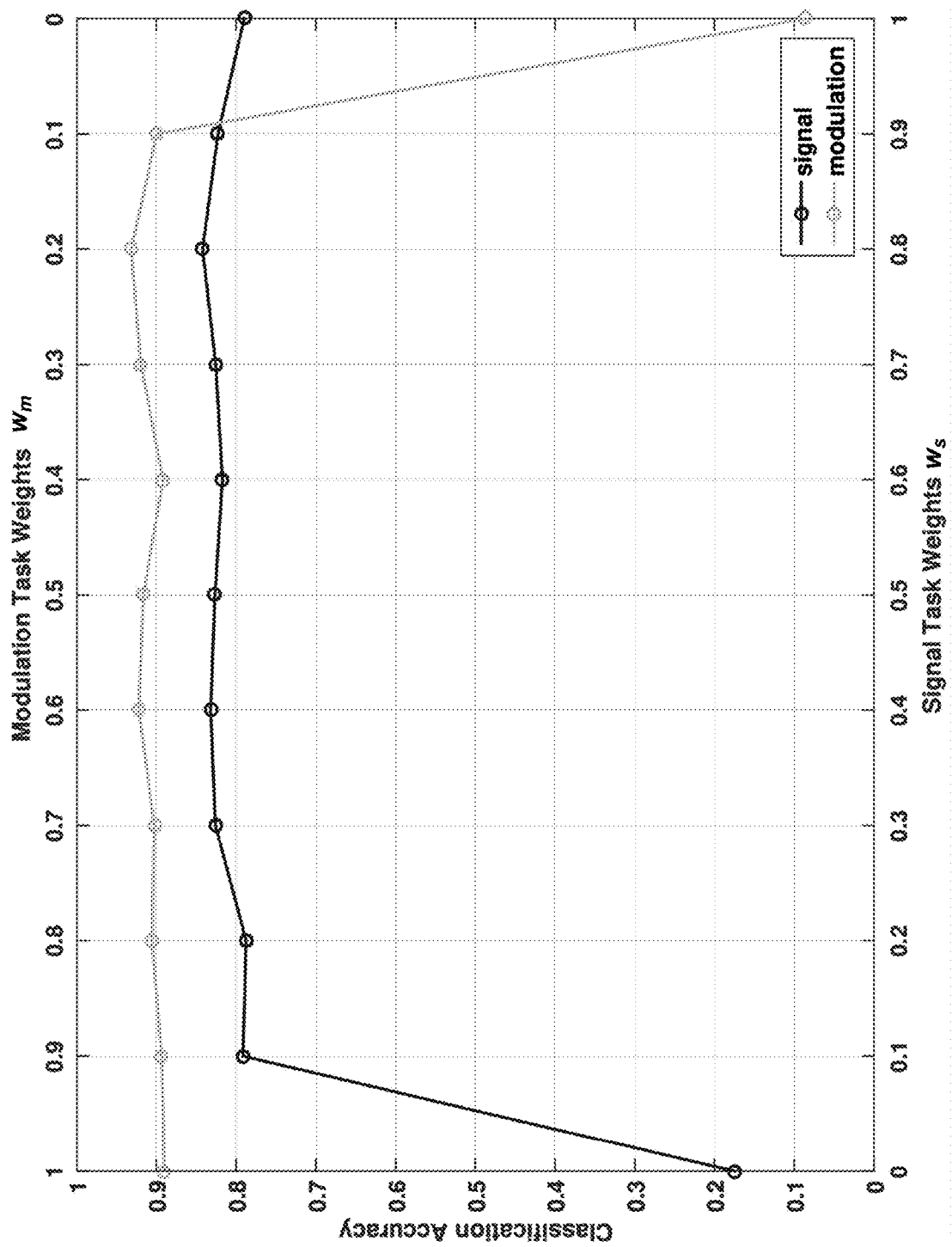
FIG. 4 is a graph depicting an example of the type of classification accuracy that may be provided by the MTL model of the MTL SIGINT framework on signal and modulation classification tasks at a very low signal-to-noise ratio (SNR) for varying weights according to various embodiments of the disclosure.

FIG. 4 is a graph depicting the classification accuracy of the MTL model 112 on the signal and modulation classification tasks at a very low SNR of −2 dB for varying weights. The number of kernels in the shared and task-specific convolutional layers were 8 and 4 respectively, and the number of neurons in the fully-connected layers of the task-specific branches was 256. The weight distribution for the signal and modulation classification tasks was varied from 0 to 1 in steps of 0.1 such that sum of weights is unity, where $w_s$ is the weight of the signal classification task and $w_m$ is the weight of the modulation classification task. The boundaries of the graph in FIG. 4 denote classification accuracies when the model was trained on individual tasks, i.e., when weights losses were set to zero. It can be seen from FIG. 4 that the model's performance was almost stable across the weighting (0.1 to 0.9 on either task). Although for some optimal weighting of $w_s$=0.8 and $w_m$=0.2, both tasks performed slightly better than at other task weights. To this extent, the loss weights for both tasks were set to $w_s$=0.8 and $w_m$=0.2 for the MTL architecture.

Effect of Network Density

Resource constrained radio platforms require lightweight neural network models for implementation on field programmable gate arrays and application-specific integrated circuits. For such realistic implementations, dense neural network models for signal characterization such as the resource-heavy AlexNet and GoogLeNet are impractical. Hence, rather than adopting dense computer vision models, the MTL SIGINT framework 100 according to embodiments was designed to arrive at a lighter MTL model 112, since network density has a direct effect on the learning efficiency and classification accuracy of the model. The number of neurons in the MTL model 112 depicted in FIG. 2 was varied and the effect of introducing additional layers in the shared as well as task-specific branches was analyzed. Results are provided in the graphs depicted in FIGS. 5-8.

The legends in FIGS. 5-8 represent the varying number of neurons as well as layers in the MTL model 112. The notations ($C_{Sh}$, $C_m$, $F_m$, $C_s$, $F_s$) imply neuron distribution with $C_{Sh}$, $C_m$, $C_s$ representing the number of filters in the convolutional layer of shared, modulation, and signal branches and $F_m$, $F_s$ denoting the number of neurons in the fully-connected layers in the modulation and signal classification branches. The additional layer inclusion notations are C2-sh and C2-sh-tasks. The notation C2-sh denotes the architecture of the MTL model 112 with two convolutional layers each followed by a max-pooling layer in the shared module. The number of filters in the convolutional layers of the shared module was set to 8. Finally, C2-sh-tasks denotes the MTL model 112 with shared module architecture the same as C2-sh but with two sequential convolutional layers in the task-specific branches. The number of filters in the convolutional layers of both task-specific branches was set to 4. The number of neurons in the fully-connected layers of task-specific branches was set to 256 for both C2-sh and C2-sh-tasks.

Figure 5:
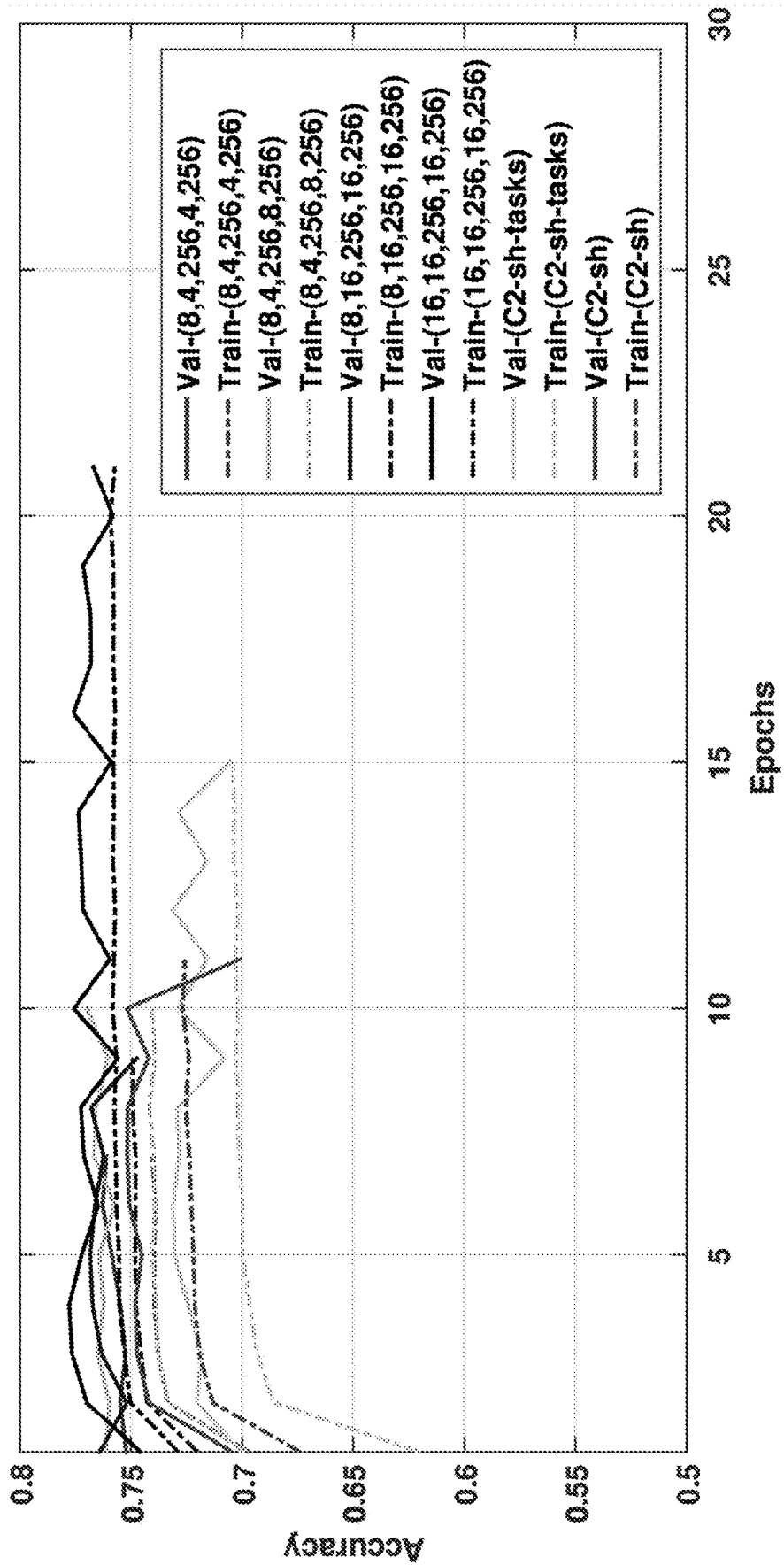
FIGS. 5 and 6 depict examples of the training performance of the MTL model of the MTL SIGINT framework with respect to two tasks under varying network densities according to various embodiments of the disclosure.
Figure 6:
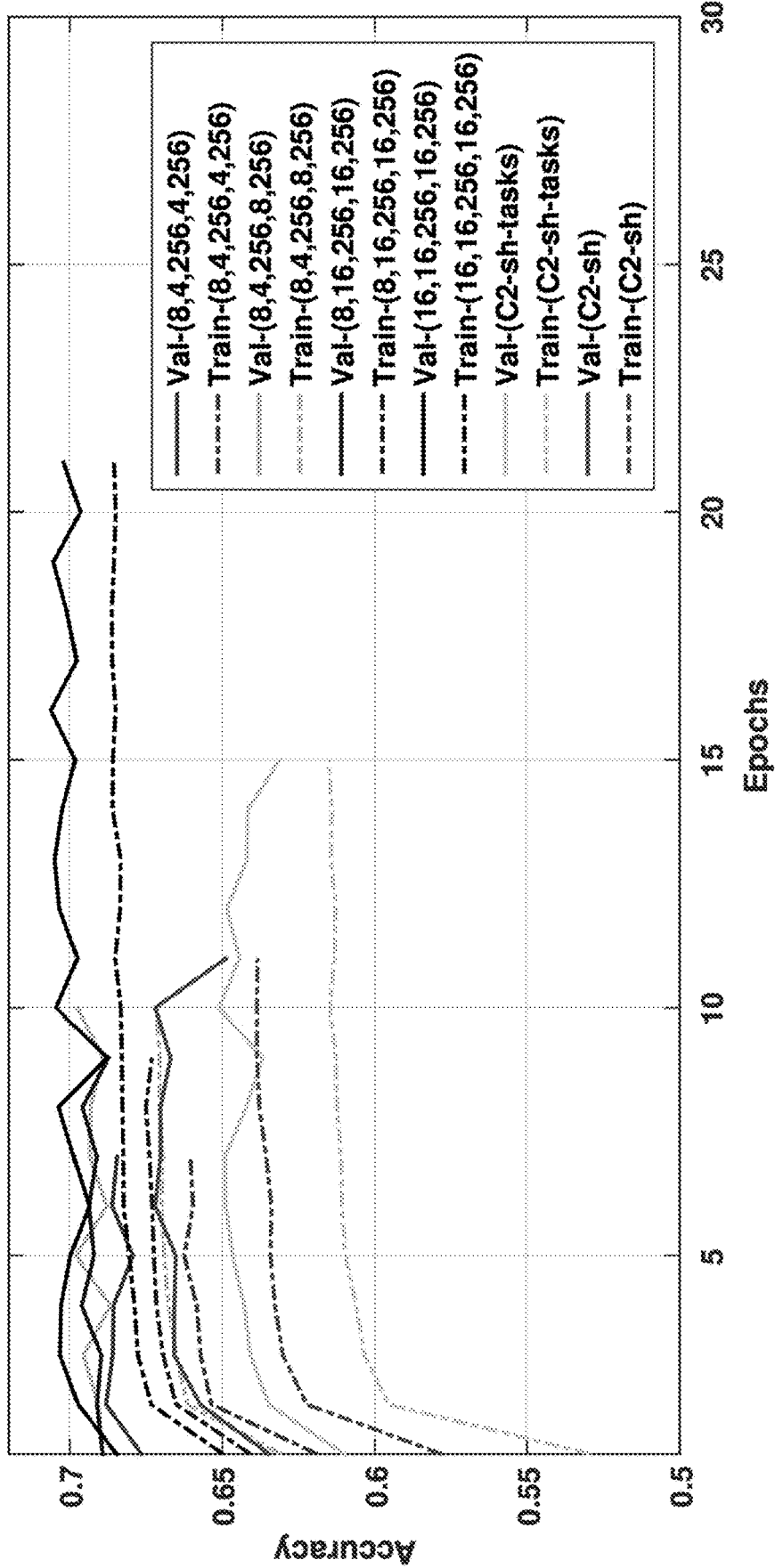
Figure 7:
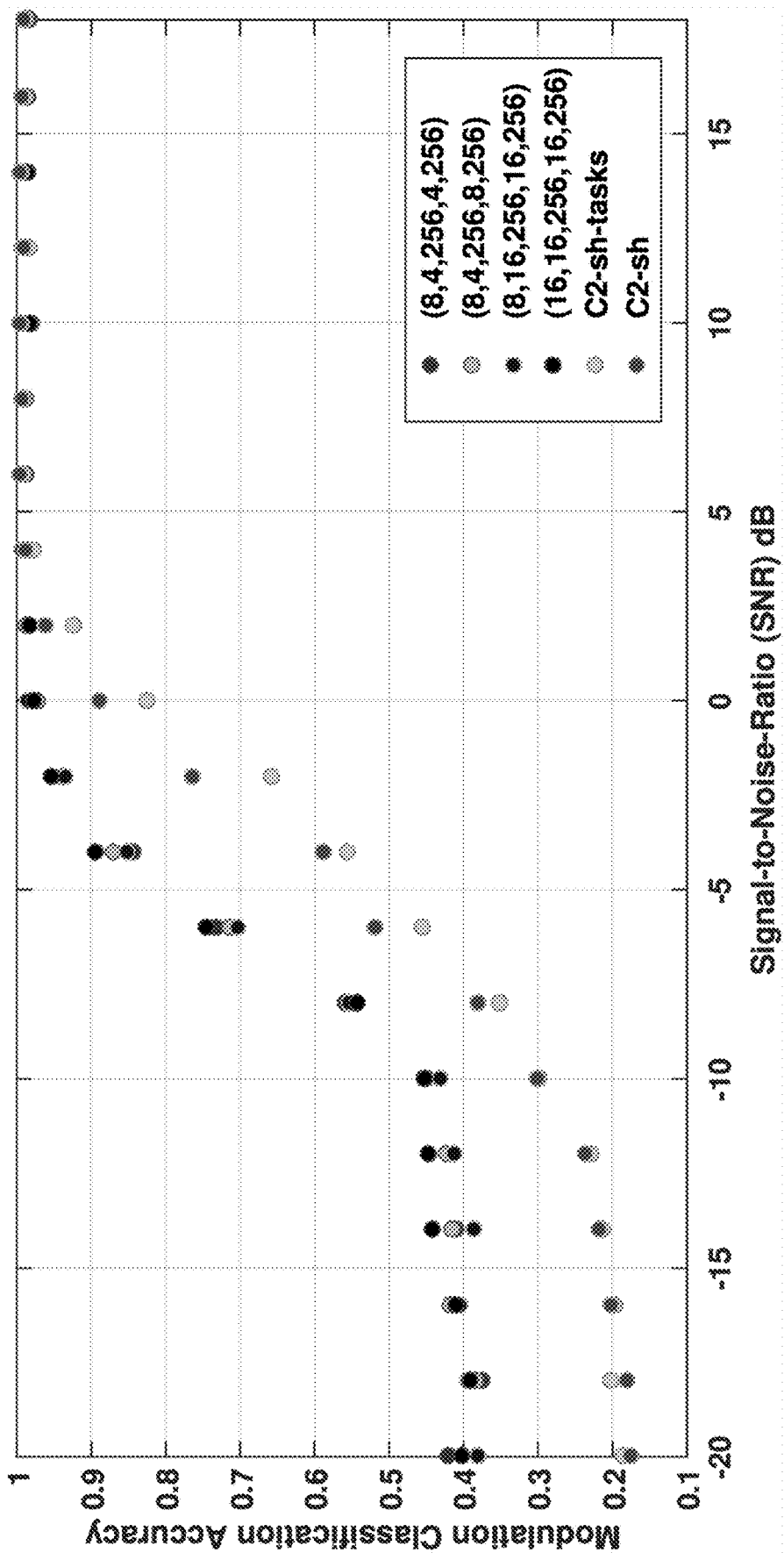
FIGS. 7 and 8 depict examples of the classification accuracy that may be provided by the MTL model of the MTL SIGINT framework on two tasks for varying network density under increasing SNR levels according to various embodiments of the disclosure.
Figure 8:
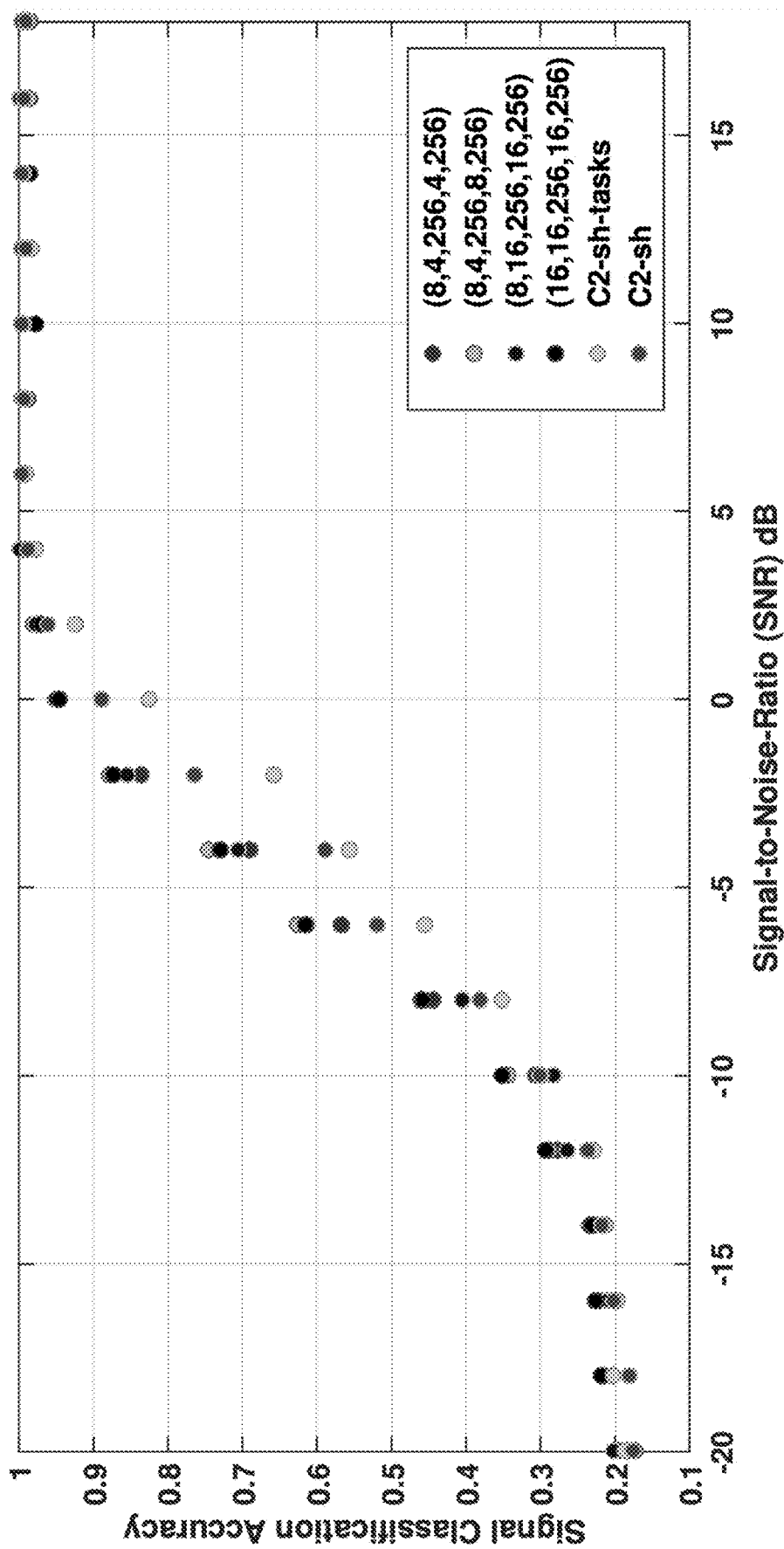

FIGS. 5 and 6 show the training performance of the MTL model 112 of the MTL SIGINT framework 100 with respect to the two tasks, and demonstrate that increasing the network density slows the training speed of the MTL model 112 (as the network parameters increase training time increases). The fastest network training time was achieved with the MTL model 112 configuration of (8, 4, 256, 4, 256), which is the lightest of all configurations. FIGS. 7 and 8 demonstrate the classification accuracies on both tasks for varying network density under increasing SNR levels (decreasing noise power). It can be seen that the additional layers in the shared (C2-sh) as well as task-specific branches (C2-sh-tasks) did not improve the classification accuracies of the MTL model 112 but rather resulted in significantly poor modulation and signal classification accuracies. Further, the MTL model 112 does not seem to benefit from the remaining dense configurations. Hence, the MTL model 112 may use the lighter configuration of (8,4,256,4,256) that yields better learning efficiency and prediction accuracies. Other configurations may also be utilized by an MTL model 112 according to embodiments, and the above example(s) are not meant to be limiting in any way.

Fine-Tuned Model Performance Evaluation

Referring again to the above-described RadComAWGN and RadComDynamic datasets, the performance of these datasets for varying noise levels was analyzed. With these tests, the performance of the MTL model 112 on waveforms impaired by just additive white Gaussian noise (AWGN) as well as waveforms affected by realistic propagation and radio hardware impairments (previously discussed in Table I) were accessed. Transfer learning was adopted on the RadComDynamic experiments by initializing the weights of the network to the tuned weights of the MTL model 112 with RadComAWGN while the weights were randomly initialized for RadComAWGN tests. The MTL model 112 exhibited a 98.58% modulation classification accuracy on the RadComAWGN dataset and 97.07% on RadComDynamic dataset at 2 dB. The signal classification accuracy of the MTL model 112 at 2 dB yielded 97.87% and 90.86% on the RadComAWGN and RadComDynamic datasets respectively. To this extent, the proposed MTL model 112 yielded above 90% accuracy at SNRs above 2 dB for both tasks with noise impaired (RadComAWGN) as well as propagation and hardware impaired (RadComDynamic) waveforms.

Another suitable MTL architecture is a sluice network employing DCNNs. Sluice networks differ from other MTL architectures in that instead of specifying at the outset whether the sluice network model will make use of hard or soft parameter sharing, sluice networks aim to learn the degree to which parameters should be shared between tasks. This is accomplished by initially starting with separate deep networks that are task specific, and then at each layer taking a weighted average of the parameters in each of the task-specific network's previous layer. The weights to be used in the averaging function can be learned via gradient descent and error backpropagation. The global loss function in a sluice network is still the sum of individual task-specific loss functions and the sluice network model is trained to minimize the aggregate loss. Many of the advantages described above with respect to the hard parameter sharing MTL model are still applicable to the sluice network model. In fact, if all weight sharing parameters in a sluice network are set equal, the sluice network model becomes a hard sharing parameter model. The potential advantage of sluice networks over the strictly hard sharing parameter architecture is the ability to modulate the degree to which task-specific information affects another task.

Kernelized multi-task learning can be viewed as a soft parameter sharing MTL model in which multiple kernelized algorithms are used to solve task-specific problems. In the case of kernelized support vector machines (SVMs), each task would be devoted an SVM responsible for performing that task, while the parameters across task-specific SVMs would relate according to a coupling distribution. One advantage of the use of kernels is the implicit representational power they provide. Kernels possess the ability to implicitly map input signals into infinite dimensional feature space and allow for operations among inputs to take place without the need to ever evaluate the inputs in the feature space. Additionally, kernels can be designed to incorporate expert domain knowledge, which may improve the learning ability of the algorithm.

The kernelized support vector machines (SVM) approach has a readily available geometric interpretation and global optimality of the SVM training algorithm renders the algorithm a viable solution and worth evaluation. But due to the nature of the learning algorithms used, SVMs may suffer from catastrophic forgetting, a phenomenon which results in the inability to retain previously learned information when new information is presented. This phenomenon may be potentially mitigated by using an ensemble of SVMs to perform learning tasks. The feasibility of this method may be evaluated in a fashion similar to the one described in the previous paragraph.

Each of the MTL models discussed above may be trained and validated using the training dataset 114, and the performance of each MTL model may be compared. While the performance of each MTL model is an important indicator of its desirability, the ability of each model to adapt and accommodate new data may also be important. An MTL model that performs marginally worse on a test training dataset yet has a much better aptitude to accommodate additional training datasets may be of greater use in a deployed setting. A potential experiment to identify which MTL model can adapt more effectively to new data is as follows. Split the entire training dataset 114 into four total datasets; two for initial testing and training, and two for "new" testing and training sets. Train each MTL model using the initial training dataset 114 and evaluate the performance of the MTL models on the initial test dataset 114. Subsequently, remove MTL models that perform unsatisfactorily. Then train each of the remaining MTL models on the "new" training dataset 114 and evaluate the performance of each model on the "new" dataset 114. This will provide insight into each MTL model's ability to adapt to unseen data and can additionally be used to evaluate the cost of retraining each model. MTL models may be evaluated against each other using the total loss across tasks averaged over the entire training dataset 114 on which the model is being evaluated.

According to embodiments, the novel MTL-based signal detection and classification architecture of the MTL SIGINT framework 100, as well as the comprehensive training dataset 114, are an asset to a modular active protection system (MAPS) and to other technologies that rely on RF intelligence such as cognitive radio, DSA, and next-generation adaptive software defined radios. The open architecture of the MTL SIGINT framework 100 will allow effortless integration onto any MAPS based solutions for combat vehicles. The MTL SIGINT framework 100 will significantly enhance the RF SIGINT aspect of the current MAPS base kits used in combat vehicles. The open framework of the MTL SIGINT framework 100 allows seamless upgrades including features and waveforms of interest. The signal classification and identification with the aid of MTL is designed to minimize the discretionary load on operators to lucidly visualize the RF environment. The spectral blue print of the environment of operation may be obtained easily as a REM without requiring the operator to identify the signal based on the classifier parameters. Assimilating valuable information from the RF spectrum of operation provides actionable intelligence to the operator or the interfaced subsystem. The MTL SIGINT framework 100 may be designed to store and use the identified signals to update the training dataset 114.

Figure 9:
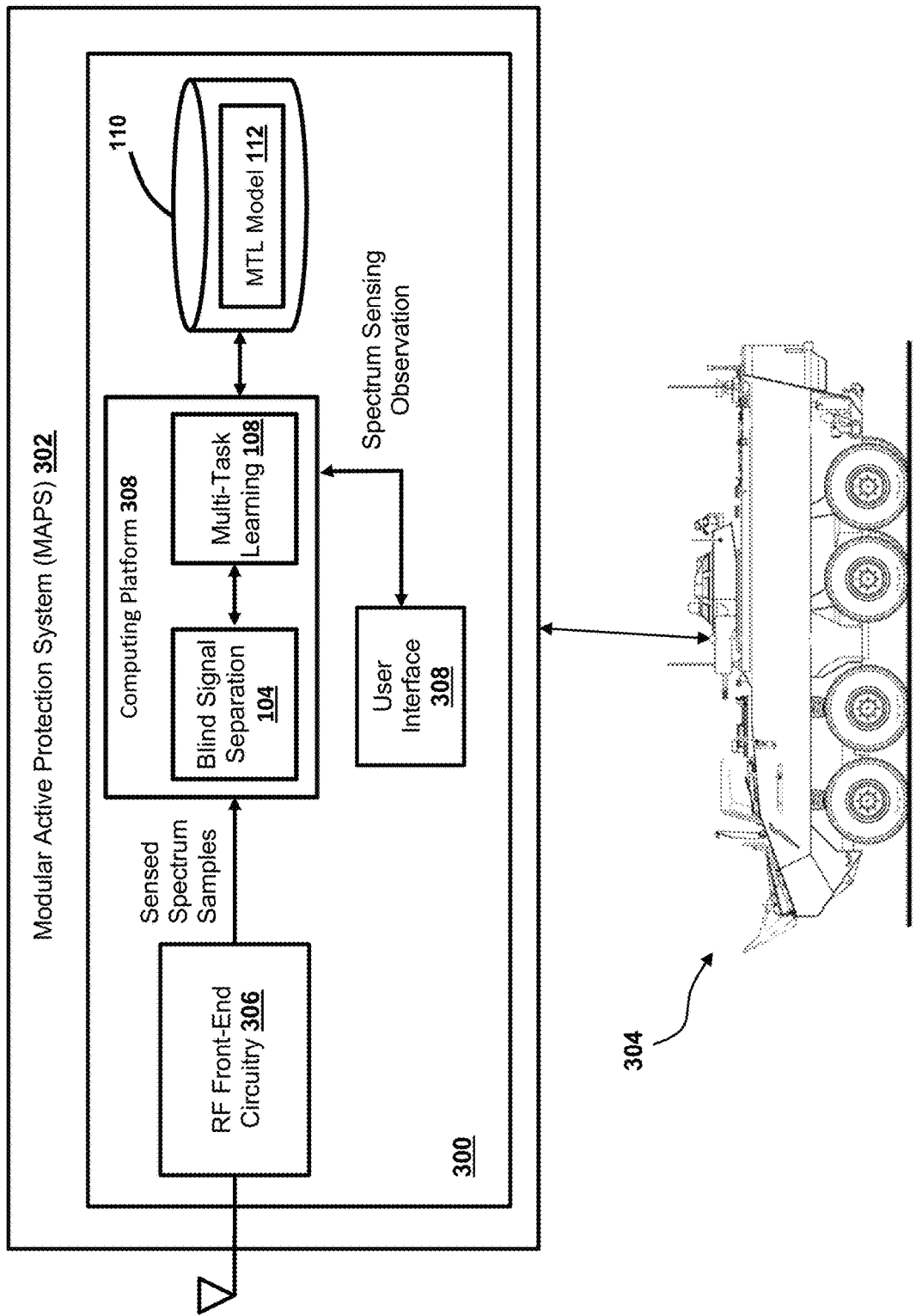
FIG. 9 depicts a radio module incorporating an MTL SIGINT framework in a modular active protection system (MAPS) according to various embodiments of the disclosure.

FIG. 9 depicts a radio module 300 incorporating various components of the MTL SIGINT framework 100. The radio module 300 may be a component of a MAPS system 302 or may be provided as a stand-alone radio system. The MAPS system 302 may be provided on a tactical vehicle 304 or as part of other tactical systems.

The radio module 300 may include RF front end circuitry 306 for receiving and sensing spectrum samples. The spectrum samples are provided to a computing platform 308 (e.g., FPGA, CPU, GPU, etc.) that includes a blind signal separation module 104 and an MTL module 108. As described above, the blind signal separation module 104 is configured to identify the underlying signals embedded in the spectrum samples. These signals are fed to the MTL module 108 which, as presented in detail above, is configured to perform multiple signal characterization tasks using a trained MTL model 112. The MTL module 108 may output the results of the performed tasks to a user via, for example, a user interface 308. Such results may also include, for example, REMs (e.g., including RF fingerprints) and RF visibility footprints or data that can be used by the MAPS system 302 to generate REMs and RF visibility footprints.

Figure 10:
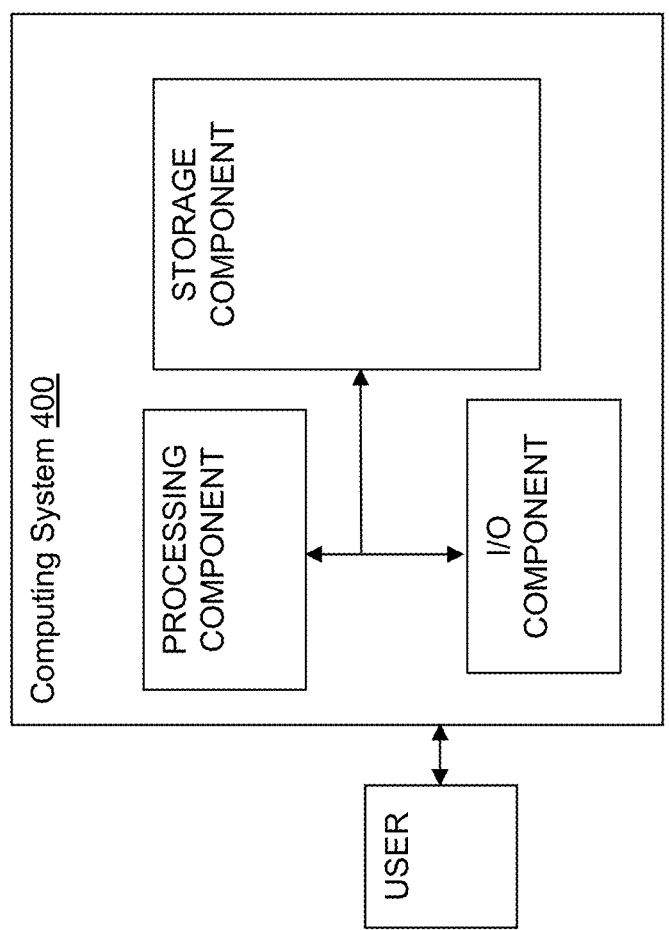
FIG. 10 depicts an illustrative computing system for implementing embodiments of the disclosure.

FIG. 10 depicts an illustrative computing system 400 for implementing the present invention, according to embodiments. The computing system 400 may comprise any type of computing device, and for example includes at least one processor, memory, an input/output (I/O) (e.g., one or more I/O interfaces and/or devices), and a communications pathway. In general, processor(s) execute program code, such as program code to implement some or all of the functions of the MTL SIGINT framework 100 which is at least partially fixed in memory. While executing program code, processor(s) can process data, which can result in reading and/or writing transformed data from/to memory and/or I/O for further processing. The pathway provides a communications link between each of the components in computing system 400. I/O can comprise one or more human I/O devices, which enable a user to interact with computing system 400.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language, Python, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the program product of the present invention may be manually loaded directly in a computer system via a storage medium such as a CD, DVD, etc., the program product may also be automatically or semi-automatically deployed into a computer system by sending the program product to a central server or a group of central servers. The program product may then be downloaded into client computers that will execute the program product. Alternatively, the program product may be sent directly to a client system via e-mail. The program product may then either be detached to a directory or loaded into a directory by a button on the e-mail that executes a program that detaches the program product into a directory. Another alternative is to send the program product directly to a directory on a client computer hard drive.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be used. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, the term "configured," "configured to" and/or "configured for" can refer to specific-purpose patterns of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system for performing signal sensing and classification method, the method system comprising:
    a computer system including a processor and memory, wherein the processor is configured to perform a method comprising:
    receiving a spectrum of radio frequency (RF) signals;
    extracting an RF signal from the received spectrum of RF signals; and
    performing a plurality of tasks in parallel and simultaneously on the extracted RF signal using a multi-task learning (MTL) neural network model;
    the plurality of tasks including at least three of:
        determining a signal class of the extracted RF signal;
        determining a modulation class of the extracted RF signal;
        determining at least one signal descriptor of the extracted RF signal;
        performing a classification task; and
        performing a regression task, wherein the regression task comprises at least one of estimating a bandwidth of the extracted RF signal and estimating a pulse-width of the extracted RF signal.

2. The system of claim 1, wherein the extracting includes performing blind signal separation to extract the RF signal from the spectrum of RF signals.

3. The system of claim 2, wherein the blind signal separation uses Eigenvalue decomposition-based signal separation to extract the RF signal from the spectrum of RF signals.

4. The system of claim 1, wherein the MTL neural network model comprises a hard parameter sharing deep convolutional neural network model.

5. The system of claim 1, the method further comprising training the MTL neural network model using a training dataset.

6. The system of claim 1, wherein the plurality of tasks further includes performing RF fingerprinting on the extracted RF signal to identify a device that produced the extracted RF signal.

7. The system of claim 1, wherein the system is incorporated into an active protection system.

8. The system of claim 7, wherein the active protection system is installed on a vehicle.

9. The system of claim 1, wherein the system is coupled to a device with an RF frontend.

10. A signal sensing and classification method, comprising:
   receiving a spectrum of radio frequency (RF) signals;
   extracting an RF signal from the spectrum of RF signals; and
   performing a plurality of tasks in parallel and simultaneously on the extracted RF signal using a multi-task learning (MTL) neural network model;
   the plurality of tasks including at least three of:
      determining a signal class of the extracted RF signal;
      determining a modulation class of the extracted RF signal;
      determining at least one signal descriptor of the extracted RF signal;
      performing a classification task;
      performing a regression task, wherein the regression task comprises at least one of estimating a bandwidth of the extracted RF signal and estimating a pulsewidth of the extracted RF signal.

11. The method of claim 9, wherein the MTL module comprises a hard parameter sharing deep convolutional neural network model.

12. The method of claim 9, further comprising generating a training dataset for training the MTL neural network model.

13. The method of claim 9, wherein the plurality of tasks further includes performing RF fingerprinting on the extracted RF signal to identify a device that produced the extracted RF signal.

14. The method of claim 9, further comprising modifying the MTL neural network model to perform at least one additional task to characterize the extracted RF signal.

15. A signal sensing and classification method, comprising:
   receiving a spectrum of radio frequency (RF) signals;
   extracting an RF signal from the spectrum of RF signals; and
   performing a plurality of tasks in parallel and simultaneously on the extracted RF signal using a multi-task learning (MTL) neural network model, wherein the MTL neural network model comprises a hard parameter sharing deep convolutional neural network model;
   the plurality of tasks including at least three of:
      determining a signal class of the extracted RF signal;
      determining a modulation class of the extracted RF signal;
      determining at least one signal descriptor of the extracted RF signal;
      performing RF fingerprinting on the extracted RF signal to identify an RF device that produced the extracted RF signal;
      performing a classification task; and
      performing a regression task, wherein the regression task comprises at least one of estimating a bandwidth of the extracted RF signal and estimating a pulsewidth of the extracted RF signal.

16. The system of claim 1, the method further comprising:
   optimizing the modulation and signal tasks with categorical cross-entropy losses $L_m$ and $L_s$, respectively, wherein an overall multi-task loss ($L_{mtl}$) function is represented as a weighted sum of the losses over the modulation and signal tasks:

$$L_{mtl}(\theta_{sh},\theta_m,\theta_s)=w_m Lm(\theta_{sh},\theta_m)+w_s Ls(\theta_{sh},\theta_s),$$

where $\theta_{sh}$ is a shared parameter,
$\theta_m$ and $\theta_s$ are task-specific parameters for the modulation and signal tasks, respectively, and
$w_m$ and $w_s$ are weights for the losses Lm and Ls, respectively.

17. The system of claim 16, the method further comprising training the MTL neural network model using a training dataset, wherein the MTL training is denoted as an optimization:

$$\theta^* = \arg\min_{\theta_{sh},\theta_m\theta_s} L_{mtl}(\theta_{sh}, \theta_m, \theta_s).$$

18. The system of claim 1, wherein the signal descriptor of the extracted RF signal comprises at least one of a bandwidth of the extracted RF signal and a pulse descriptor word of the extracted RF signal.

19. The system of claim 1, wherein the method further comprises generating at least one of a radio environment map and an RF visibility footprint based on the extracted RF signal.

* * * * *